United States Patent [19]

Cottam

[11] Patent Number: 5,390,497
[45] Date of Patent: Feb. 21, 1995

[54] SELF-ADJUSTING CLUTCH ACTUATOR

[75] Inventor: Michael J. Cottam, Nr. Preston, England

[73] Assignee: Eaton Corporation, Cleveland, Ohio

[21] Appl. No.: 28,007

[22] Filed: Mar. 8, 1993

Related U.S. Application Data

[63] Continuation-in-part of Ser. No. 873,260, Apr. 24, 1992, abandoned.

[30] Foreign Application Priority Data

Mar. 14, 1992 [GB] United Kingdom ............... 9205661

[51] Int. Cl.$^6$ ........................... F15B 7/00; B60T 13/00
[52] U.S. Cl. ..................................... 60/533; 60/547.1; 192/85 R
[58] Field of Search ......... 60/534, 536, 547.1, 60/586, 533; 192/85 R, 85 C, 111 A, 110 R; 91/361

[56] References Cited

U.S. PATENT DOCUMENTS

| | | | |
|---|---|---|---|
| 4,052,855 | 10/1977 | Prillinger et al. | 60/547.1 |
| 4,081,065 | 3/1978 | Smyth et al. | 192/855 |
| 4,206,455 | 6/1980 | Isakson | 60/534 X |
| 4,646,891 | 3/1987 | Braun | 192/0.032 |
| 4,653,272 | 3/1987 | Sibeud et al. | 60/586 |
| 4,773,222 | 9/1988 | Tanaka et al. | 60/534 |
| 4,899,858 | 2/1990 | Cott et al. | 192/0.092 |
| 4,926,994 | 5/1990 | Koshizawa | 192/110 |
| 5,009,299 | 4/1991 | Seegers | 192/85 |
| 5,012,722 | 5/1991 | McCormick | 91/361 |
| 5,036,965 | 8/1991 | Cortesi et al. | 192/85 R |
| 5,048,656 | 9/1991 | Braun | 192/85 |

FOREIGN PATENT DOCUMENTS

| | | |
|---|---|---|
| 324553 | 3/1991 | European Pat. Off. . |
| 2136847 | 12/1972 | France . |
| 1347923 | 2/1974 | United Kingdom . |

Primary Examiner—Edward K. Look
Assistant Examiner—Hoang Nguyen
Attorney, Agent, or Firm—Howard D. Gordon

[57] ABSTRACT

A self-adjusting pneumatically operated vehicular master clutch actuator is provided. A pneumatically operated primary actuation piston (1) carries a push/pull rod (7) for operation of a master clutch linkage (22). The push/pull rod (7) is mounted to the primary piston (1) by a hydraulic adjustment assembly (2, 10, 12, 11) for axial movement therewith. Sensing device (4), at least partially interior of the primary cylinder housing (8), for sensing the axial position of the primary actuation piston are also provided.

4 Claims, 1 Drawing Sheet

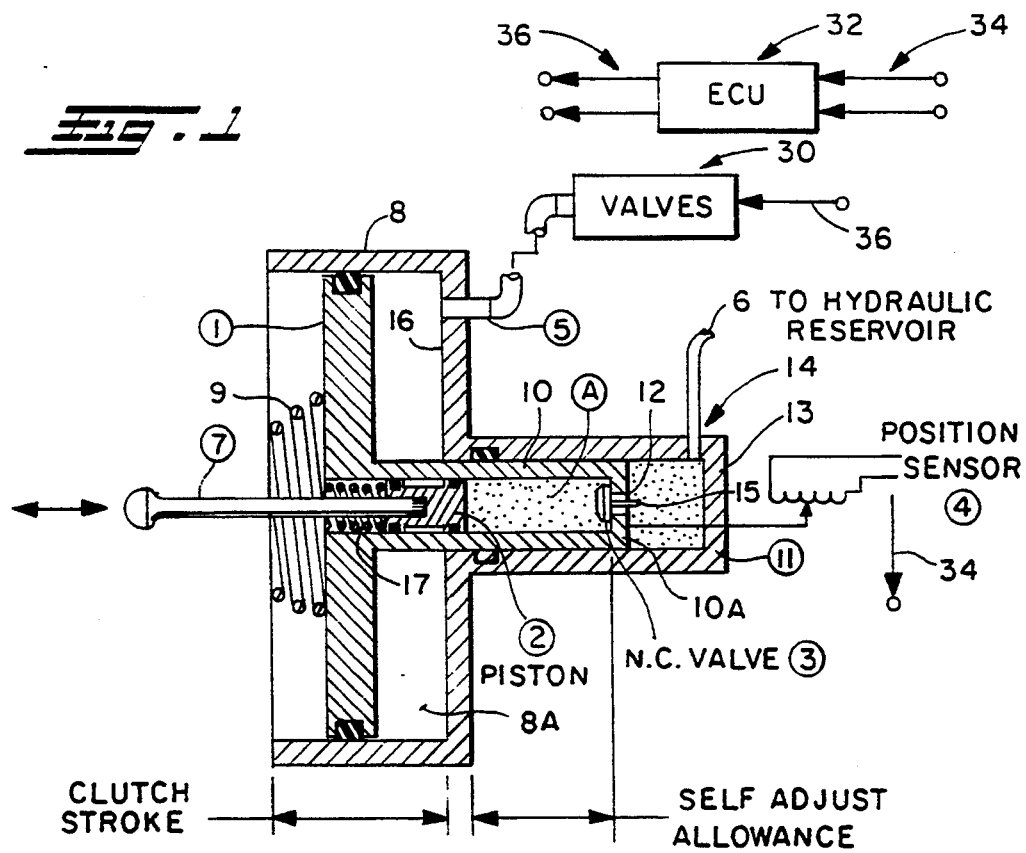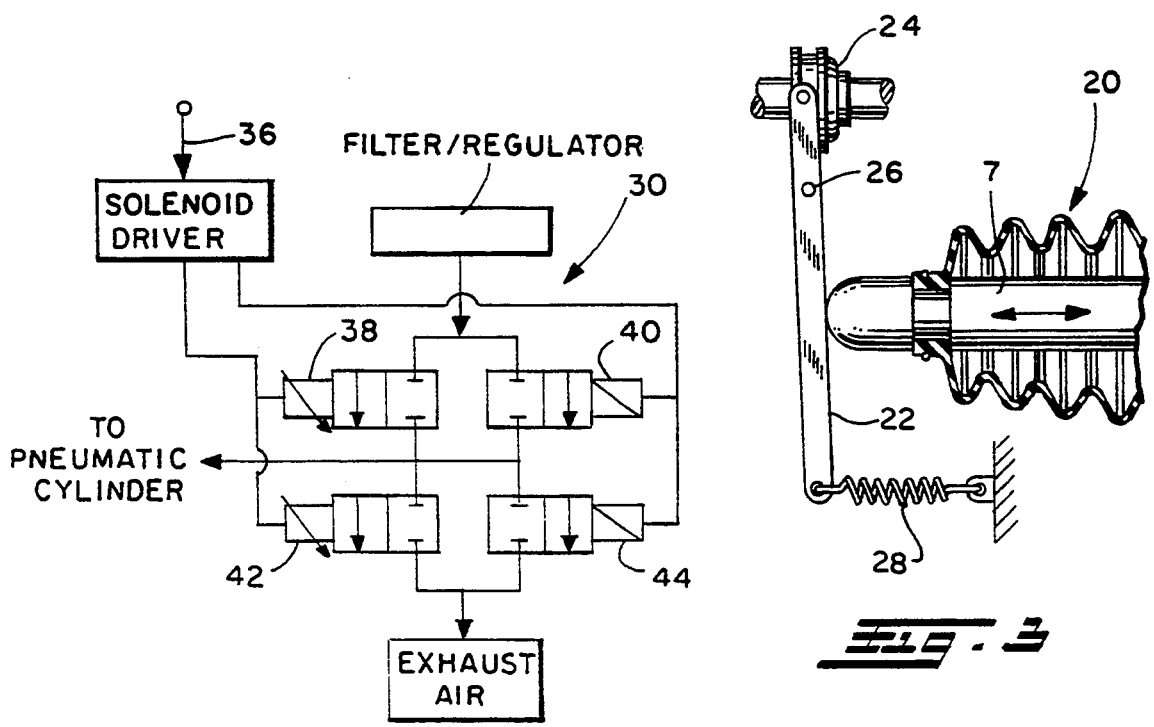

SELF-ADJUSTING CLUTCH ACTUATOR

BACKGROUND OF THE INVENTION

Related Applications

The present application claims priority from GB 9205661.3 filed Mar. 14, 1992 and assigned to the assignee of this application and is a continuation-in-part of copending U.S. patent application Ser. No. 07/873,260 filed Apr. 24, 1992 (EP 92303169.4), now abandoned and assigned to the assignee of this application.

FIELD OF THE INVENTION

The present invention relates to a clutch actuator control system for controlling the engagement and disengagement of clutches, such as normally engaged vehicular master clutches, in response to command output signals from a microprocessor based control unit or the like. More particularly, the present invention relates to a clutch actuator control system for automatically controlling the engagement and disengagement of the vehicular master clutch by means of a mechanical push or pull rod wherein the actuator includes a piston which is driven pneumatically and which drives a clutch operator through push/pull rod linkage. The rod is carried on the pneumatic piston by a hydraulic self-adjust mechanism whereby the value of a parameter indicative of the relative axial positioning of the pneumatic piston is a relatively accurate indication of the degree of engagement (such as "touch point") of the controlled master clutch.

DESCRIPTION OF THE PRIOR ART

Automatic actuator control systems for controlling the engagement and disengagement of vehicular master clutches are well known in the prior art and are often incorporated into automated or semi-automated transmission systems. Typically, such actuator control systems have comprised electric, pneumatic and/or hydraulic clutch operators controlled by microprocessor based electronic control units, i.e., ECUs, which process a plurality of input signals according to predetermined logic rules to issue command output signals to various control devices such as solenoid control valves and the like. Examples of such control systems may be seen by reference to U.S. Pat. Nos. 4,595,986; 4,081,065 and 4,361,060, the disclosures of which are hereby incorporated by reference.

In the automatic control of vehicular master clutches, especially during the reengagement of such clutches, an important control parameter is the current value of a controllable variable at the point of reengagement of the clutch known as the "touch point" or the point of "incipient engagement" of the clutch. Typically, during reengagement of vehicular master clutches, especially during reengagement of a master clutch for a start from stop operation, the master clutch is rapidly moved from the fully disengaged position thereof to the point of incipient engagement, and thereafter the clutch is reapplied in a modulated fashion according to predetermined logic rules. Control methods/systems for determining the value of controllable parameters corresponding to the incipient engagement point of a vehicular master clutch are known in the prior art and may be seen in greater detail by reference to U.S. Pat. Nos. 4,646,891 and 4,899,858, the disclosures of both of which are hereby incorporated by reference.

Vehicular master clutch control systems utilizing an actuator having two pistons rigidly connected together and running in separate cylinders wherein one piston is driven pneumatically and the other piston drives a clutch operator through a hydraulic linkage are known in the prior art and an example thereof may be seen by reference to European Patent No. EP 324,553B, the disclosure of which is hereby incorporated by reference.

The prior art devices were not totally satisfactory as, due to wear, constant recalibration was required to calibrate various feedback signals to selected operational positions of the clutch and/or clutch condition sensors were required at the clutch which required complicated and/or expensive wiring and/or wiring harnesses and required sensors exposed to difficult vibrational and heat conditions and the like and/or the clutch actuators were not self-compensating for wear.

SUMMARY OF THE INVENTION

In accordance with the present invention, the drawbacks of the prior art vehicular master clutch actuator control systems are minimized or overcome by the provision of an actuator control system for controlling the engagement and disengagement of a vehicular master clutch which is self-compensating for wear and other free play of the master clutch, and which allows clutch operating position to be accurately determined as a function of the axial position of a remote pneumatically operated clutch actuator piston.

The above is accomplished by providing an actuator control system for vehicular master clutch wherein the actuator includes a piston which is driven pneumatically against a resilient return spring bias and which is coupled to a push (or pull) rod control linkage by a self-adjusting hydraulic coupling. The present invention proposes to use the well-known ability of a hydraulic coupling to correct for mechanical free-play and wear by means of a reservoir with the object of avoiding having to constantly correct input signals according to sensed mechanical variations. By utilizing the piston structure described above, the present invention is effective to achieve accurate operating condition of the clutch by accurately positioning the remotely controlled pneumatic piston face.

Preferably, the present invention includes a cylinder assembly in which the pneumatically operated piston is pneumatically driven and having a hydraulic reservoir for providing automatic compensation for mechanical free-play and wear of the controlled vehicular master clutch by adjusting the position of the push/pull rod relative to the pneumatic piston. As is well known, vehicular master clutches are typically spring biased to a fully engaged position and moveable by some type of clutch operating device against the spring bias into a fully disengaged position. Preferably, the pneumatic cylinder assembly includes an actuator housing and will include a transducer located in the interior of said housing to generate signals indicative of the position of the piston. Pneumatic valving, operated in accordance with command output signals from the electronic control unit, is utilized to provide controlled pneumatic drive of the piston in dependence upon the transduced position—indicating signals. It is preferred that the pneumatic valves and/or the transducer may be installed with manifolding and electrical connections to the valves and the transducer in the pneumatic cylinder assembly housing structure.

In the preferred embodiment, at least two solenoid control valves are provided for connecting a chamber of the pneumatic cylinder associated with the actuation piston to either a high pressure source or a low (atmosphere) source. Preferably, two pairs of solenoid valves, a fine flow valve and a course flow valve, are provided for selectively pressurizing and exhausting the pneumatic operating chamber. As is known, control of the valves may be by a pulse width modulation method or the like.

Accordingly, it may be seen that a new and improved pneumatically operated actuator control system for controlling the engagement and disengagement of a vehicular master clutch is provided which allows the clutch position to be accurately determined as a function of the axial position of a remote actuator device, such as a pneumatic piston and which is self-compensating for wear and free-play of the clutch thereby eliminating the necessity for relatively frequent recalibration of the clutch control system.

These and other objects and advantages of the present invention will become apparent from a reading of the detailed description of the preferred embodiments taken in connection with the drawings.

BRIEF DESCRIPTION OF THE DRAWINGS

FIG. 1 is a schematic illustration of the clutch actuator of the present invention.

FIG. 2 is a more detailed schematic illustration of the pneumatic control valving of the present invention.

FIGS. 3 is a partial illustration of a push/pull rod type clutch actuation linkage.

DESCRIPTION OF THE PREFERRED EMBODIMENT

In the following description of the preferred embodiment, certain terms will be used for convenience and reference only and are not intended to be limiting. The terms "upwardly", "downwardly", "rightwardly" and "leftwardly" will designate directions in the drawings to which reference is made. The words "inwardly" and "outwardly" will refer to directions towards and away from, respectively, the geometric center of the device and designated parts thereof. The above applies to the words above specifically mentioned, derivatives thereof and words of similar import.

The present invention relates to a pneumatically operated actuator of the mechanical push/pull rod type which is suitable for an automatic or semi-automatic vehicular master clutch actuation system.

A portion of a typical push rod mechanical clutch operation linkage 20 is illustrated in FIG. 3. Rod 7 is engageable with clutch release lever 22 which is pivotably fixed about pivot point 26 with the clutch release bearing 24. A return spring 28 is provided to bias the lever 22 and bearing 24 into the clutch engaged positions thereof.

The operating rod 7 of the invention is moved axially in any known manner, by pneumatic power applied to a primary piston in a cylinder, in some arrangement (such as automatic or semi-automatic actuation), where the degree of engagement of the clutch needs to be reliable and repeatably sensed. Thus the primary piston should maintain its relative position with respect to the operating stroke of the clutch, whatever the degree of mechanical wear in the clutch or in the clutch friction surfaces. If a computer type control (electronic control unit, "ECU") does not "know" when a clutch is just beginning to bite, or is 50% engaged, for example, operation will be unpredictable, rough or lead to over-rapid wear of the drive, or of the driven device e.g. the vehicle.

Some types of clutches wear such that the incipient engagement position of the control rod lies further in the push direction; the effects of wear on other types (sometimes called pull clutches) however, lead to engagement occurring earlier, perhaps tending to cancel any lost motion. The present invention is aimed to be applicable to compensate for either type for wear.

Referring to FIG. 1, a first primary piston 1 moves in a pneumatic cylinder 8 when pneumatic pressure is supplied via connection 5 to a piston chamber 8A of the cylinder and is thus applied to drive piston 1 against a spring 9. A clutch may be disengaged pneumatically and engaged by the spring, or vice-versa. Spring 9 may supplement or be replaced by the return spring 28 illustrated in FIG. 3.

The primary pneumatic piston 1 is integral with a secondary hydraulic cylinder 10, in which a second piston 2 moves and which can form a sort of piston as well, since it moves in a third hydraulic cylinder 11. The third cylinder 11 is integral with the primary cylinder 8 and has a port 14 for connection to a hydraulic supply or reservoir conduit 6. The third cylinder 11 holds an amount of hydraulic fluid which is increased and then reduced with every stroke of the secondary cylinder and hence of the first piston.

Internally, the secondary cylinder 10 has an adjustment chamber A which contains a charge of hydraulic fluid, which is used to transmit the movements of the second cylinder 10 in the third cylinder 11 to a clutch push rod 7 through second piston 2, this operating rod 7 being moved leftwardly to disengage or to engage a clutch through a linkage mechanism. The clutch plates and/or the linkage mechanism may be, or may gradually become, defective or worn. The leftward drive of the rod is produced by pneumatic pressure and is against the usual bias (28) acting on the clutch or rod, and also against the spring 9 acting on piston 1.

The end wall 12 of the second cylinder 10 has a passage 10A therethrough opening to the third cylinder 11 in which is mounted a normally closed valve 3 which has a stem 15 abutted whenever the return spring 9 drives piston 1 rightwardly after a disengagement of the clutch, and hence the end wall 12 of the secondary cylinder 10 is driven adjacent to or against the end wall 13 of the third cylinder. This point is arranged as a datam point, in that the clutch is designated as just fully engaged, so that an end point can be calibrated on a position sensor 4. The hydraulic exhaust or supply conduit 6 is now connected to chamber A through chamber 11 and passage 10A because the stem 15 of the valve is abutted and the valve opens. If wear has caused engagement to be too early, oil will flow out of A. If wear has caused too late an engagement, or a nonengagement at the designated fully engaged position, the fluid will flow back into 6 to relieve A.

In all presently preferred embodiments, the throw of the pneumatic piston 1 will be from a leftward position such as that shown, to a fully rightward position abutting the end wall 16 of cylinder 8. When at the latter position, the clutch has not been fully engaged by spring 9, the aforementioned release springs 28 of the clutch will drive rod 7 and piston 2 rightwards, to drive hydraulic oil out of adjustment cylinder A. There may also be a compression spring 17 in the position shown, acting between piston 1 and piston 2, assisting the driving out of the hydraulic fluid or oil. This spring 17 would have been charged up by the disengagement stroke of the clutch. If the clutch had been of the push type where wear caused early engagement, the spring 17 would be replaced on the right hand side as viewed of the piston 2, thus acting against the inside of the end wall of cylinder 10 (or on some other suitable abutment in this cylinder).

In fact, the aforementioned designated end position is preferably a little beyond full engagement, to give a predetermined small amount of free play before the disengagement stroke begins to disengage the clutch. In this case a spring such as that shown at 17 is almost certainly essential, to locate the starting position of the piston 2.

When piston 1 and cylinder 10 are driven leftwardly, the valve stem 15 is no longer abutted, and will provide an assisting check-valve effect to keep the normally closed valve 3 closed by hydraulic compression within chamber A. The piston 2 and the rod 7 itself are driven leftwardly, with primary piston 1, by the fluid of A, and the position of the clutch is accurately indicated by the piston position signalled by sensor 4.

Hydraulic self-adjustment assemblies similar that described above are known in the prior art as may be seen by reference to U.S. Pat. No. 5,009,299, the disclosure of which is in incorporated herein by reference.

The pneumatic valve assembly 30 for selectively venting and exhausting pneumatic chamber 8A is controlled by a microprocessor based ECU 32 which receives inputs 34 from various sensor such as clutch position sensor 4 and sensors indicative of engine speed, vehicle speed, transmission shaft speeds and the like. ECU 32 will process these inputs according to predetermined logic rules to issue command output signals to various actuators such as to the valve assembly 30.

FIG. 2 schematically illustrates the high pressure and exhaust pneumatic solenoid control valves 38–44 of valve assembly 30. As illustrated, pressurized air is provided through valves 38 and 40 which may control a course fill or fine fill orifice, respectively, while exhaust may be controlled by solenoid valves 42 and 44 which in like manner may control a course or fine orifice. Alternatively, the solenoid valves themselves may have a course On/Off control and a fine On/Off control respectively. The control of the valve may be by the width of pulses in a power-amplified square pulse wave. Such pulse width modulation valve and the use of parallel course and fine fill or course or fine exhaust controlled conduit, of course, known in the prior art.

The course controlled valves could use a different type of valve which need only be suitable for On/Off control. The pulse valves which must be of a quicker reacting type, which will closely and continuously follow the duty cycle of the modulation. It will often be preferable to use only one exhaust valve and/or one high pressure feed valve, if they can be operated at 100% duty cycle for On/Off operation and also at duty cycles graded down to 5% or even 0. Such solenoid valves controlled by pulse width modulation are available from the Honeywell Corporation.

There are many control methods and systems for the automatic operation of vehicular master clutches as may be seen by reference to above-mentioned U.S. Pat. Nos. 4,081,065; 4,361,060; 4,646,891 and 4,899,858, the disclosures of all of which are hereby incorporated by reference.

Typically, such control system involved a calibration or learning process where various clutch operating positions of interest, such as the point of incipient engagement, the point of full engagement, etc., are determined with time and a controlled or monitored clutch actuator parameter is calibrated thereto. Such a calibration procedure is discussed in U.S. Pat. No. 5,014,832, the disclosure of which is hereby incorporated by reference. According to the present invention, the clutch operational position is monitored by observation of the pneumatic drive piston/secondary cylinder 10 axial position by means of transducer 4.

From the foregoing, it is believed that those familiar with the art will recognize and appreciate the novel concepts and features of the improved actuator control system for vehicular master clutches of the present invention. While the present invention has been described in relation to only a single preferred embodiment, numerous variations, changes and substitutions of equivalents will present themselves to persons skilled in the art and may be made without departing from the scope and spirit of the present invention.

I claim:

1. An actuator control system for controlling the operation of a rod (7) linkage operated vehicular master clutch constantly biased (28) to a first fully engaged position and adopted to be driven to a second position by axial movement of said rod, said system including a primary actuator piston (1) slidably and sealingly received in a primary cylinder (8) and defining a chamber (8A) connected to a selectively pneumatically pressurized and exhausted conduit (5), said system characterized by:

a hydraulic mounting assembly carried by said primary actuator piston for adjustably mounting said rod to said primary actuator piston for axial movement therewith, said hydraulic mounting assembly including a secondary cylinder (10) defined by said primary actuation piston (1), a secondary piston (2) slidably and sealing received in said secondary cylinder and defining an adjustment chamber (A) filled with hydraulic fluid, said rod axially fixed to said secondary piston, said adjustment chamber in constant fluid communication with a hydraulic reservoir by a fluid passage (10A) controlled by a normally closed valve (3) opening (15) upon said primary actuation piston moving to a preselected axial position.

2. The system of claim 1 wherein said secondary cylinder (10) is slidably received in a third cylinder (11) defined by said primary cylinder (8) housing, said third cylinder constantly filled with hydraulic fluid and communicating with said secondary cylinder by means of said fluid passage (10A).

3. An actuator control system for controlling the operation of a rod (7) linkage operated vehicular master clutch constantly biased (28) to a first fully engaged position and adopted to be driven to a second disengaged position by axial movement of said rod, said system including a primary actuator piston (1) slidingly and sealingly received in a primary cylinder (8) housing and defining a chamber (8A) connected to a selectively pneumatically pressurized and exhausted conduit (5), said system characterized by:

a hydraulic mounting assembly carried by said primary actuator piston for adjustably mounting said rod to said primary actuator piston for axial movement therewith, said hydraulic mounting assembly including a secondary cylinder (10) defined by said primary actuation piston (1), a secondary piston (2) slidably and sealing received in said secondary cylinder and defining an adjustment chamber (A) filled with hydraulic fluid, said rod axially fixed to said secondary piston, said adjustment chamber in constant fluid communication with a hydraulic reservoir by a fluid passage (10A) controlled by a normally closed valve (3) opening (15) upon said primary actuation piston moving to a preselected axial position, a control unit (32) for controlling the pressurization of said selectively pressurized and exhausted conduit (5), and a transducer (3) located at least partially in the interior of said housing for sensing a current axial position of said primary actuator piston in said body and for providing input signals (34) to said control unit indicative thereof.

4. The system of claim 3 wherein said secondary cylinder (10) is slidably received in a third cylinder (11) defined by said primary cylinder (8) housing, said third cylinder constantly filled with hydraulic fluid and communicating with said secondary cylinder by means of said fluid passage (10A).

* * * * *